US012807156B2

(12) United States Patent
Ferguson et al.

(10) Patent No.: US 12,807,156 B2
(45) Date of Patent: Nov. 24, 2026

(54) ROBUST METHOD FOR DETECTING TRAFFIC SIGNALS AND THEIR ASSOCIATED STATES

(71) Applicant: Waymo LLC, Mountain View, CA (US)

(72) Inventors: David I. Ferguson, San Francisco, CA (US); Nathaniel Fairfield, Rockingham, VA (US); Anthony Levandowski, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/905,849

(22) Filed: Oct. 3, 2024

(65) Prior Publication Data

US 2025/0026352 A1 Jan. 23, 2025

Related U.S. Application Data

(63) Continuation of application No. 18/218,290, filed on Jul. 5, 2023, now Pat. No. 12,134,384, which is a (Continued)

(51) Int. Cl.
*B60W 30/18* (2012.01)
*B60W 60/00* (2020.01)
(Continued)

(52) U.S. Cl.
CPC .... *B60W 30/18154* (2013.01); *B60W 60/001* (2020.02); *G05D 1/0231* (2013.01); (Continued)

(58) Field of Classification Search
None
See application file for complete search history.

(56) References Cited

U.S. PATENT DOCUMENTS 6,151,539 A 11/2000 Bergholz et al.
6,516,262 B2 2/2003 Takenaga et al.
(Continued)

FOREIGN PATENT DOCUMENTS

CN 1383531 A 12/2002
CN 101900567 A 12/2010
(Continued)

OTHER PUBLICATIONS

Levinson et al., "Traffic light mapping, localization, and state detection for autonomous vehicles", 2011 IEEE Conference on Robotics and Automation (ICRA), May 9, 2011, pp. 5784-5791.*
(Continued)

*Primary Examiner* — Peter D Nolan
*Assistant Examiner* — Michael F Whalen
(74) *Attorney, Agent, or Firm* — McDonnell Boehnen Hulbert & Berghoff LLP

(57) ABSTRACT

Methods and devices for detecting traffic signals and their associated states are disclosed. In one embodiment, an example method includes a scanning a target area using one or more sensors of a vehicle to obtain target area information. The vehicle may be configured to operate in an autonomous mode, and the target area may be a type of area where traffic signals are typically located. The method may also include detecting a traffic signal in the target area information, determining a location of the traffic signal, and determining a state of the traffic signal. Also, a confidence in the traffic signal may be determined. For example, the location of the traffic signal may be compared to known locations of traffic signals. Based on the state of the traffic signal and the confidence in the traffic signal, the vehicle may be controlled in the autonomous mode.

20 Claims, 11 Drawing Sheets

Related U.S. Application Data continuation of application No. 17/080,724, filed on Oct. 26, 2020, now Pat. No. 11,731,629, which is a continuation of application No. 15/667,015, filed on Aug. 2, 2017, now Pat. No. 10,906,548, which is a continuation of application No. 14/831,777, filed on Aug. 20, 2015, now Pat. No. 9,796,386, which is a continuation of application No. 13/430,150, filed on Mar. 26, 2012, now Pat. No. 9,145,140.

(51) Int. Cl.
*G05D 1/00* (2006.01)
*G06V 20/56* (2022.01)
*G06V 20/58* (2022.01)

(52) U.S. Cl.
CPC ............ *G06V 20/56* (2022.01); *G06V 20/582* (2022.01); *G06V 20/584* (2022.01); *B60W 2420/403* (2013.01); *B60W 2554/20* (2020.02); *B60W 2555/60* (2020.02); *B60W 2556/20* (2020.02); *B60W 2556/50* (2020.02)

(56) References Cited

U.S. PATENT DOCUMENTS

| | | | |
|---|---|---|---|
| 7,031,554 | B2 | 4/2006 | Iwane |
| 7,230,538 | B2 | 6/2007 | Lai et al. |
| 8,134,480 | B2 | 3/2012 | Onome et al. |
| 8,559,673 | B2 | 10/2013 | Fairfield et al. |
| 8,620,032 | B2 | 12/2013 | Zeng |
| 8,712,104 | B2 | 4/2014 | Fairfield et al. |
| 8,793,046 | B2 | 7/2014 | Lombrozo et al. |
| 9,145,140 | B2 | 9/2015 | Ferguson et al. |
| 9,158,980 | B1 | 10/2015 | Ferguson et al. |
| 9,796,386 | B2 | 10/2017 | Ferguson et al. |
| 2002/0106135 | A1 | 8/2002 | Iwane |
| 2005/0283699 | A1 | 12/2005 | Nomura et al. |
| 2006/0009188 | A1 | 1/2006 | Kubota et al. |
| 2007/0112461 | A1 | 5/2007 | Zini et al. |
| 2008/0162027 | A1 | 7/2008 | Murphy et al. |
| 2009/0174573 | A1 | 7/2009 | Smith |
| 2009/0303077 | A1 | 12/2009 | Onome et al. |
| 2010/0004856 | A1 | 1/2010 | Kobori et al. |
| 2010/0033571 | A1 | 2/2010 | Fujita et al. |
| 2010/0100268 | A1 | 4/2010 | Zhang et al. |
| 2011/0182473 | A1 | 7/2011 | Wang |
| 2011/0182475 | A1 | 7/2011 | Fairfield et al. |
| 2011/0302214 | A1 | 12/2011 | Frye et al. |
| 2012/0010797 | A1 | 1/2012 | Luo |
| 2012/0221207 | A1* | 8/2012 | Nakamura ............. G08G 1/166 701/41 |
| 2012/0288138 | A1* | 11/2012 | Zeng .................. G08G 1/09623 382/103 |
| 2013/0211682 | A1 | 8/2013 | Joshi |
| 2014/0016826 | A1 | 1/2014 | Fairfield et al. |
| 2014/0129060 | A1 | 5/2014 | Cooper et al. |
| 2014/0129154 | A1 | 5/2014 | Cooper et al. |
| 2014/0159924 | A1 | 6/2014 | Lee |
| 2014/0185880 | A1 | 7/2014 | Fairfield et al. |
| 2015/0189244 | A1 | 7/2015 | Hegemann et al. |
| 2015/0234386 | A1 | 8/2015 | Zini et al. |
| 2016/0139594 | A1 | 5/2016 | Okumura et al. |
| 2016/0318490 | A1 | 11/2016 | Ben Shalom |
| 2017/0084172 | A1 | 3/2017 | Rolle et al. |
| 2017/0350713 | A1 | 12/2017 | Bhatia et al. |
| 2018/0257615 | A1 | 9/2018 | Rawashdeh et al. |
| 2018/0285664 | A1 | 10/2018 | Satyakumar et al. |
| 2018/0307925 | A1 | 10/2018 | Wisniowski et al. |

FOREIGN PATENT DOCUMENTS

| | | | |
|---|---|---|---|
| CN | 104411559 | B | 4/2018 |
| CN | 108482378 | A | 9/2018 |
| EP | 1127727 | A2 | 8/2001 |
| EP | 1127727 | A3 | 8/2001 |
| EP | 2830922 | | 2/2015 |
| JP | 2004-077189 | A | 3/2004 |
| JP | 2004-171459 | A | 6/2004 |
| JP | 2005-347945 | A | 12/2005 |
| JP | 2006-048624 | A | 2/2006 |
| JP | 2007-178223 | A | 7/2007 |
| JP | 2011-180022 | A | 9/2011 |
| JP | 2012-048345 | A | 3/2012 |
| JP | 2013-30006 | A | 2/2013 |
| JP | 2013-518298 | A | 5/2013 |
| JP | 6270064 | B2 | 1/2018 |
| JP | 6622265 | B2 | 11/2019 |
| KR | 10-1839554 | B1 | 3/2018 |
| KR | 10-1953521 | B1 | 2/2019 |
| WO | 02/01505 | A1 | 1/2002 |
| WO | 2009/035697 | A1 | 3/2009 |
| WO | 2011/091099 | A1 | 7/2011 |

OTHER PUBLICATIONS

Levinson et al., "Towards fully autonomous driving: Systems and algorithms", 2011 IEEE Intelligent Vehicles Symposium (IV), Jun. 5, 2011, pp. 163-168.*
International Search Report for corresponding international application No. PCT/US2013/024573 mailed May 13, 2013.*
Written Opinion for corresponding international application No. PCT/US2013/024573 mailed May 13, 2013.*
International Preliminary Report on Patentability for corresponding International Application No. PCT/US2013/024573 mailed Oct. 9, 2014.*
Translation of Office Action mailed Oct. 20, 2015 in Japanese Patent Application No. 2015-503202.*
Extended European search report from corresponding European Patent Application No. 13768787.7 mailed Oct. 27, 2015.*
Office Action issued in related Korean Patent Application No. 10-2014-7027190, Preliminary Rejection dated Nov. 3, 2015.*
Office Action issued in related Chinese Patent Application No. 201380016416.6, May 27, 2016.*
Translation of Office Action issued in related Japanese Patent Application No. 2015-503202, Jun. 2016.*
Office Action issued in related Korean Patent Application No. 10-2014-7027190, Final Rejection Jun. 2016.*
Office Action issued in related Korean Patent Application No. 10-2014-7027190, second Final Rejection Sep. 2016.*
Translation of Office Action issued in related Chinese Patent Application No. 201380016416.6, Jan. 2017.*
Translation of Office Action issued in related Korean Patent Application No. 10-2016-7034056, Mar. 2017.*
Translation of Office Action issued in related Chinese Patent Application No. 201380016416.6, Jun. 2017.*
Translation of Office Action issued in related Japanese Patent Application No. 2015-503202, Jun. 2017.*
Communication pursuant to Article 94(3) EPC [EPO Form 2001] from corresponding European Patent Application No. 13768787.7 mailed Nov. 24, 2017.*
Office Action issued in related Korean Patent Application No. 10-2018-7007123 Preliminary Rejection dated Jun. 1, 2018.*
Translation of Office Action issued in related Japanese Patent Application No. 2017-168460, Aug. 7, 2018.*
Translation of Office Action issued in related Japanese Patent Application No. 2017-168460, Feb. 14, 2019.*
Exam Report from European Patent Application No. 13768787.7, dated Mar. 8, 2019.*
Translation of Office Action issued Aug. 21, 2020 in related Chinese Patent Application No. 201810239045.2.*
Communication pursuant to Article 94(3) EPC in related European Patent Application No. 21161577.8, mailed Sep. 22, 2022*.
Extended European Search Report issued Oct. 7, 2021, in related European Patent Application No. 21161577.8*.
Fairfield et al., "Traffic light mapping and detection", Robotics and Automation (ICRA), 2011 IEEE International Conference on, IEEE, May 9, 2011, pp. 5421-5426, XP032033986, DOI: 10.1109/ICRA.

(56) References Cited

OTHER PUBLICATIONS 2011.5980164 ISBN: 978-1-61284-386-5*.
Translation of Office Action issued Apr. 2, 2021 in related Chinese Patent Application No. 201810239045.2.
Koukoumidis et al., "SignalGuru: Leveraging Mobile Phones for Collaborative Traffic Signal Schedule Advisory", MobiSys '11 (2011)*.

* cited by examiner

314

| STATE | | OUTPUT |
|---|---|---|
| State of traffic signal | Minimum distance > threshold ? | Control command |
| RED | YES | Brake and determine additional information |
| RED | NO | Brake |
| YELLOW | YES | Decelerate and determine additional information |
| YELLOW | NO | Decelerate and determine additional information |
| GREEN | YES | Determine additional information and proceed with caution |
| GREEN | NO | Maintain velocity or accelerate |
| UNKNOWN | YES | Decelerate and determine additional information |
| UNKNOWN | NO | Decelerate and determine additional information |

316 318

FIGURE 3B

ROBUST METHOD FOR DETECTING TRAFFIC SIGNALS AND THEIR ASSOCIATED STATES

CROSS-REFERENCE TO RELATED APPLICATIONS

This application is a continuation of U.S. patent application Ser. No. 18/218,290 filed on Jul. 5, 2023, which is a continuation of U.S. patent application Ser. No. 17/080,724 (now U.S. Pat. No. 11,731,629) filed on Oct. 26, 2020, which is a continuation of U.S. patent application Ser. No. 15/667,015 (now U.S. Pat. No. 10,906,548) filed on Aug. 2, 2017, which is a continuation of U.S. patent application Ser. No. 14/831,777 (now U.S. Pat. No. 9,796,386) filed on Aug. 20, 2015, which is a continuation of U.S. patent application Ser. No. 13/430,150 (now U.S. Pat. No. 9,145,140) filed on Mar. 26, 2012, the entire contents of each of which are hereby incorporated by reference.

BACKGROUND

Some vehicles are configured to operate in an autonomous mode in which the vehicle navigates through an environment with little or no input from a driver. Such a vehicle may include one or more sensors that are configured to sense information about the environment. The vehicle may use the sensed information to navigate through the environment.

For example, if an output of the sensors is indicative that the vehicle is approaching an obstacle, the vehicle may navigate around the obstacle. Additionally, a vehicle may sense information about traffic signs and traffic signals. For example, traffic signs may provide regulatory information or warning information while traffic signals positioned at road intersections, pedestrian crossings, and other locations may be used to control competing flows of traffic.

SUMMARY

In one example aspect, a method is disclosed that includes scanning a target area using one or more sensors of a vehicle to obtain target area information. The vehicle may be configured to operate in an autonomous mode and the target area may be a type of area where traffic signals are typically located. The method may also include detecting a traffic signal in the target area information and determining a location of the traffic signal. Additionally, a state of the traffic signal and a confidence in the traffic signal may be determined. Determining the confidence in the traffic signal may include, but is not limited to, comparing the location of the traffic signal to one or more known locations of traffic signals. According to the method, the vehicle may be controlled in the autonomous mode based on the state of the traffic signal and the confidence in the traffic signal.

In another example aspect, a non-transitory computer-readable medium is disclosed having stored therein instructions executable by a computing device to cause the computing device to perform functions. The functions may include scanning a target area using one or more sensors of a vehicle to obtain target area information. The vehicle may be configured to operate in an autonomous mode and the target area may be a type of area where traffic signals are typically located. The functions may also include detecting a traffic signal in the target area information and determining a location of the traffic signal. Additionally, based on the functions, a state of the traffic signal and a confidence in the traffic signal may be determined. Determining the confidence in the traffic signal may include, but is not limited to, comparing the location of the traffic signal to one or more known locations of traffic signals. According to the functions, the vehicle may be controlled in the autonomous mode based on the state of the traffic signal and the confidence in the traffic signal.

In yet another example aspect, an example vehicle configured to be operated in an autonomous mode is disclosed. The vehicle may include one or more sensors, a memory, a processor, and instructions stored in the memory and executable by the processor. The instructions may be executable to cause the one or more sensors to scan the target area to obtain target area information. The target area may be a type of area where traffic signals are typically located. The instructions may also be executable to detect a traffic signal in the target area information, determine a location of the traffic signal, and determine a state of the traffic signal. Additionally, the instructions may be executable to determine a confidence in the traffic signal. Determining the confidence in the traffic signal may include comparing the location of the traffic signal to one or more known locations of traffic signals. The instructions may be further executable to control the vehicle in the autonomous mode based on the state of the traffic signal and the confidence in the traffic signal.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 3A-3B are an example flow chart and associated state table for controlling a vehicle.

DETAILED DESCRIPTION

Figure 1:
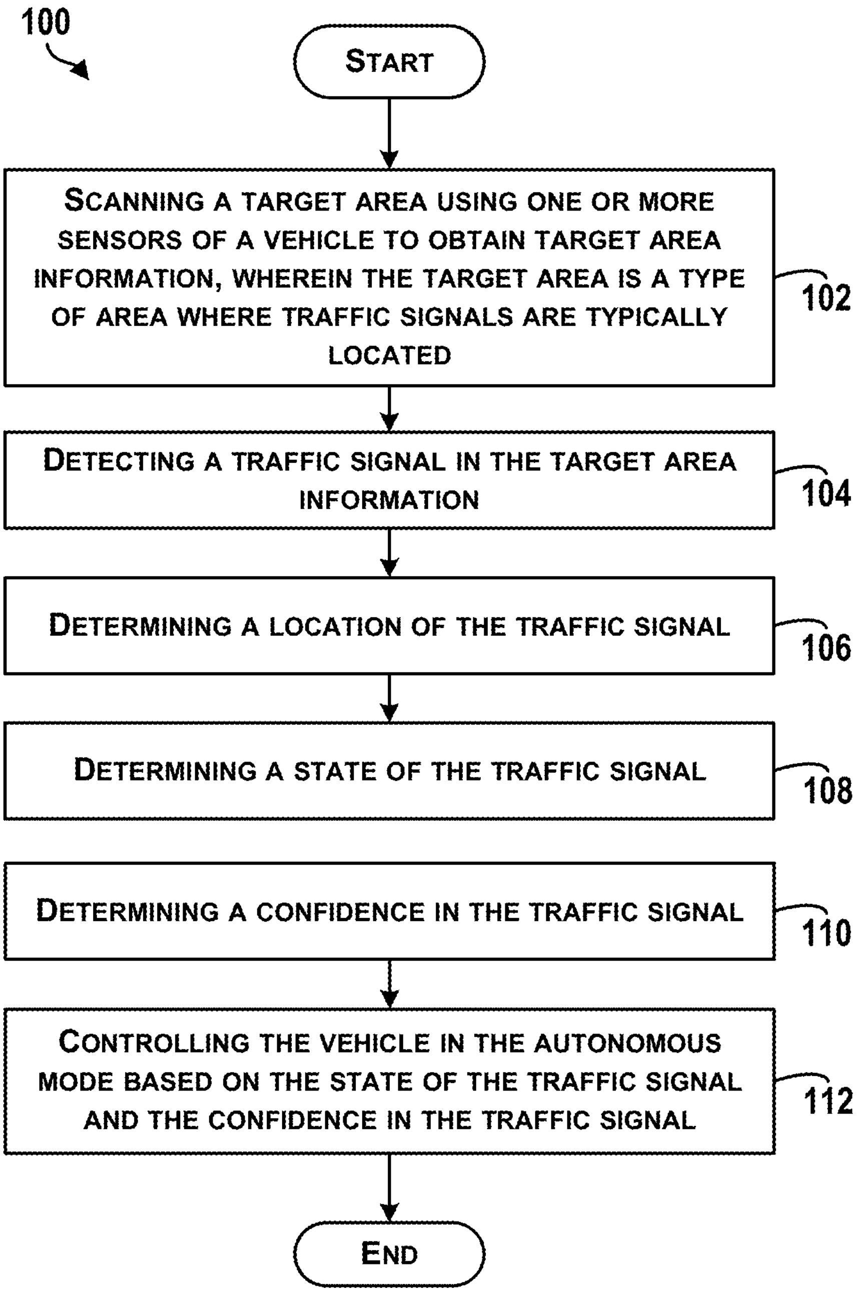
FIG. 1 is a block diagram of an example method of controlling a vehicle.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure as generally describe herein, and illustrated in the figures, can be arranged, substituted, combined, separated, and designed in a wide variety of different configurations, all of which are explicitly contemplated herein.

A vehicle, such as a vehicle configured to operate autonomously, may be configured to scan a target area to obtain target area information. One or more sensors of the vehicle may scan the target area. In one example, the target area may be a type of area where traffic signals are typically located. For instance, general information about where traffic signals typically appear, such as proximity to intersections, range of height, proximity to an edge of a road, etc., may be used to determine the target area. In some examples, the sensors of the vehicle may continually scan the target area to find traffic lights that have been moved temporarily or permanently, and/or to find new traffic lights such as traffic lights for which no prior information is available.

As an example, data associated with known locations of traffic signals may indicate that a given percentage of traffic lights appear within a height range defined by a lower height bound and upper height bound above the ground. A vehicle may use the height range to scan an upcoming area to obtain target area information between the lower height bound and the upper height bound.

In some instances, a traffic signal may be detected in the target area information. In an instance in which a map of traffic signals suggests a traffic signal exists in an area of an environment, the vehicle may expect to find a traffic signal in the target area information. Alternatively, if the map of traffic signals does not indicate any traffic signals in the target area, the vehicle may still scan the target area in case a traffic signal is actually present. Additionally, a state associated with a detected traffic signal may be determined. The associated state may subsequently be used to control the vehicle in the autonomous mode.

In a further instance, a confidence in a detected traffic signal and an associated state of the traffic signal may be determined based on a scenario in which the traffic signal is detected. For example, a vehicle may be more confident in a detected traffic signal in locations in which the vehicle expects to detect traffic signals and less confident in a detected traffic signal in locations in which the vehicle does not expect to detect traffic signals. Accordingly, in some examples, control of the vehicle may be modified based on a confidence in a traffic signal.

FIG. 1 is a block diagram of an example method 100 of controlling a vehicle. Method 100 shown in FIG. 1 represents a method that could be used with the vehicles described herein, for example, and may be performed by a vehicle or components of a vehicle, or more generally by a server or other computing device. Method 100 may include one or more operations, functions, or actions as illustrated by one or more of blocks 102-112. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the block diagram shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, such as, for example, a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is configured to perform the specific logical functions in the process.

Figure 6:
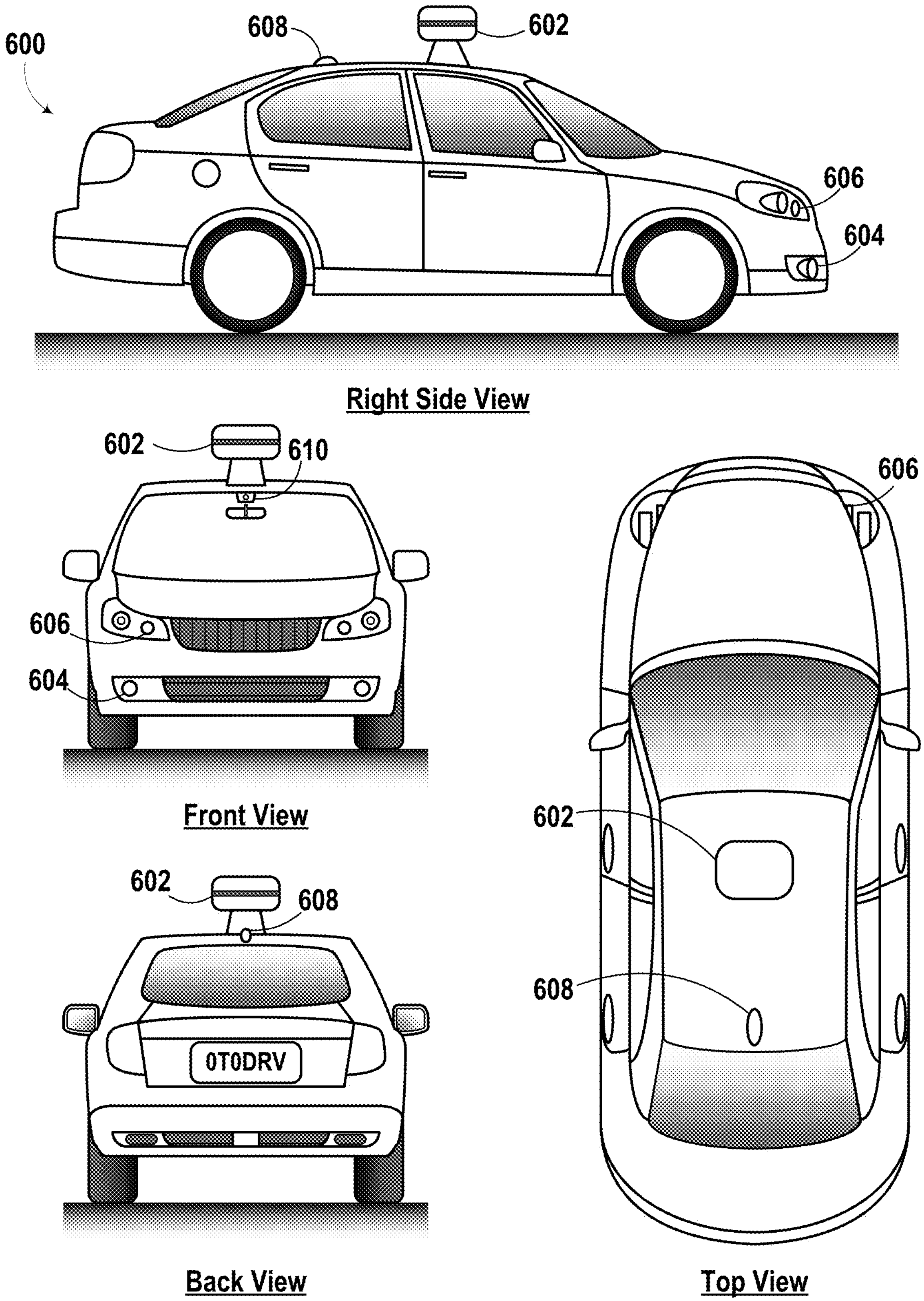
FIG. 6 illustrates an example vehicle, in accordance with an embodiment.
Figure 7:
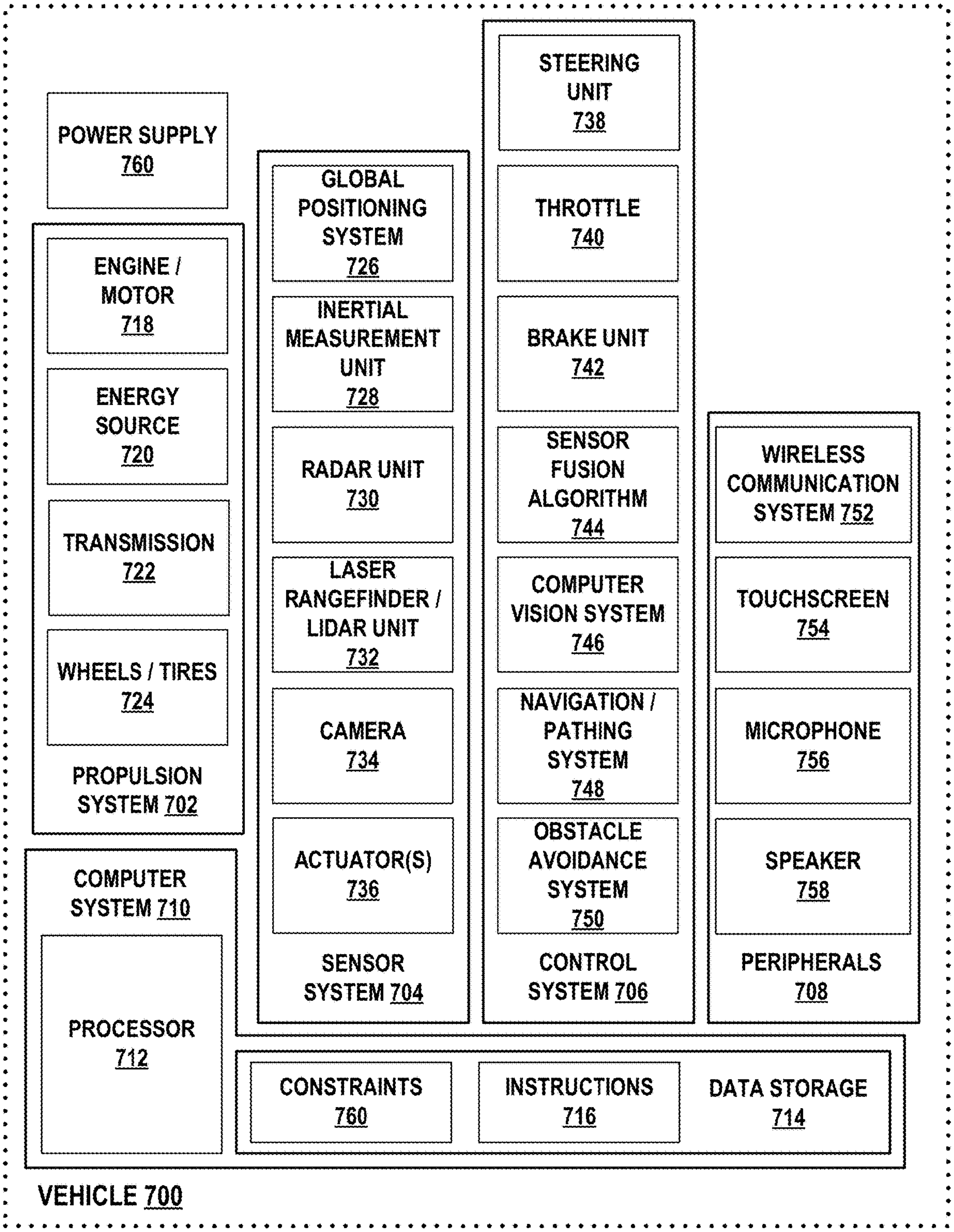
FIG. 7 is a simplified block diagram of an example vehicle, in accordance with an embodiment.

As shown, initially, at block 102, the method 100 includes scanning a target area using one or more sensors of a vehicle to obtain target area information. In some instances, the vehicle may be configured to be operated in an autonomous mode. The vehicle described with respect to FIGS. 6 and 7 is one such example of a vehicle that may be configured to operate autonomously. In some instances, a control command as determined based on a state and location of a traffic signal may be used to assist a driver of the vehicle or provided as input to a control system of the vehicle.

In one example, the target area may be a type of area where traffic signals are typically located. For example, the target area may include a range of heights and or widths that are typical for traffic signals. The target area may be a portion of an upcoming area corresponding with a direction of travel of the vehicle. In one instance, statistical information about known locations of traffic signals may indicate that a given percentage of traffic signals occur between a range of heights above the ground. As an example, data collected about traffic signals may indicate that 90% of traffic signals are elevated between 10 and 16 feet above the ground. Similarly, information about known locations of traffic signals may indicate that a given percentage of traffic signals are positioned within a given amount(s) to the left or right of a travel lane or road. Based on the statistics for positions of traffic signal, a predetermined target area may be selected.

Accordingly, in one example, the vehicle may constantly scan the target area. In some instances, the target area may change based on conditions of the vehicle or environments in which the vehicle is located. As an example, the target area may be widened or narrowed based on a speed or orientation of the vehicle. The vehicle may include a GPS receiver (or other geographic positioning component) to determine a geographic location and an accelerometer, gyroscope, or other acceleration device to determine a pitch, yaw, and roll (or changes thereto) relative to the direction of gravity. In one instance, the target area may widen if the vehicle is turning. In another instance, the target area may be expanded when a geographic location of the vehicle is approaching an intersection. In some instances, a geographic location of the vehicle may be compared to a map of an environment that includes information about intersections of roads to determine a proximity of the vehicle to an intersection.

The one or more sensors of the vehicle may include imaging components and/or non-imaging components. For example, various types of cameras may be mounted in various configurations to the vehicle to obtain the target area information. In one instance, a camera may be positioned to face straight ahead and mounted behind or near a rear-view mirror. Additionally, a camera may capture a specific region of interest, such as a 2040×1080 region, of a camera with a fixed lens with a 30 degree field of view. The camera may be calibrated to detect traffic signals at various distances to ensure a reasonable braking distance. In a further example, gain and shutter speeds of the camera may be set to avoid saturation of traffic lights during the day and/or night.

In another example, the one or more sensors may include a three-dimensional (3D) scanning device configured to determine distances to surfaces of objects in the target area. In one instance, a structured light projection device and camera may be used to determine a three-dimensional point cloud describing the target area. In another instance, a laser and/or radar device such as a LIDAR or a laser rangefinder may scan the target area to determine distances to objects. In other instances, a stereo camera or time-of-flight camera may be used for range imaging. Thus, the target area information may include any combination of two-dimensional images and three-dimensional point clouds describing the target area.

The target area information may also be stored in one or more short-term or long-term memories. At block 104, the method 100 includes detecting a traffic signal in the target area information. In some instances, a pattern, template, shape, or signature that is expected for traffic signals may be identified in the target area information. As an example, a traffic signal classifier may find a pattern of red, yellow, and green objects with appropriate size and aspect ratios, and label the pattern as a potential traffic signal. Any example image processing techniques may be used to identify one or more portions of the image matching a known pattern. Template matching is one possible example. Although the present disclosure is described in conjunction with typical vertical or horizontal traffic signals having a set of red, yellow, and green lights, it will be understood that this specific structure is used merely as an example. Traffic signals may have varied and sometimes complex geometries and these additional geometries may also be detected.

In an example in which the target area information includes a three-dimensional point cloud, an object in the 3D point cloud having a shape that is expected for traffic signals may be detected. For example, 3D point cloud based object recognition systems may be used to identify features describing interest points within the 3D point cloud. The features may subsequently be compared to features expected for a 3D model of one or more types of traffic signals to recognize groups of interest points as objects within the 3D point cloud that are traffic signals.

At block 106, the method 100 includes determining a location of the traffic signal. In some instances, geographic location information and/or orientation information of the vehicle may be associated with the target area information. For example, in an instance in which the target area information includes an image, metadata associated with the image may indicate a geographic location and orientation of the vehicle (or a sensor of the vehicle used to obtain the target area information) when the target area information was obtained. Based on the geographic location and orientation of the vehicle and/or sensor of the vehicle, a location of the detected traffic signal may be estimated.

As an example, the location of the traffic signal may be estimated based on a location of the vehicle (or a sensor of the vehicle). For example, GPS coordinates of the vehicle as well as heading or direction of travel may be determined for an instance in time at which the target area information was obtained. The location of the vehicle and direction of travel may be associated with a road map of an area, and a nearest upcoming intersection on the road map may be identified. The location of the traffic signal may be determined to be the location of the intersection.

In another example, the location of the traffic signal may be estimated in 3D using triangulation. To estimate the position in 3D via triangulation, two or more images of a detected traffic signal may be used. For example, a traffic signal (or multiple traffic signals) may be detected in two or more images. In some instances, it may be determined that a traffic signal of a first image is the same traffic signal as a traffic signal in the second image. In the case of near-affine motion and/or high frame rates, template trackers may be used to associate detected traffic signals in subsequent images.

In a case in which the frame rate is lower (e.g., 4 fps), direct motion compensation may be used. If a precise pose of the vehicle is known for each image, changes in roll, pitch, and yaw between images may be straightforward to correct for between images using a camera model describing movement of the camera. However, an estimate of a position of the traffic signal may be needed to account for apparent motion of objects between images due to movement of the vehicle (e.g., forward motion). In one example, by assuming the traffic light has a diameter of about 0.3 meters. The distance d to a traffic light with a true width of w and apparent width $w_a$ in an image taken by a camera with a focal length f can be found as:

$$d \approx \frac{w}{2\tan\left(\frac{w_a}{2f}\right)}.$$

Additionally, the direction vector $X=[u,v]^T$ may be computed using the camera model such that the approximate 3D position of the traffic light is $$y = \sin(\arctan(-u))d,$$

$$z = \sin(\arctan(-v))d,$$

$$x = \sqrt{d^2 - y^2 - z^2}.$$

Continuing, if $T_1$ and $T_2$ are 4×4 transformation matrices for two different times from a frame of the vehicle to a locally smooth coordinate frame, the relative motion of a traffic signal from one image to another can be corrected as:

$$\hat{x}_1 = CT_2T_1^{-1}C^{-1}x_1,$$

where C is the transform from the vehicle frame to the camera coordinate frame. In some examples, image coordinates may be further adjusted to account for radial distortion.

In one instance, if the motion-corrected position of a traffic signal from a first image falls within an association distance of a traffic signal of a second image, it may be likely that the detected traffic signals correspond to the same object. If it has been determined that a detected traffic signal in a first image corresponds to a detected traffic signal in a second image, least squares triangulation may be used to estimate the 3D position of the traffic signal based on positions of the traffic signal in the first and second image and camera orientations for the first and second image while the images were obtained.

In some examples, traffic signals may also be identified to the actual lane to which they apply. For example, some traffic signals may apply to left or right turn lanes. This information may be used to determine which traffic signal(s) a vehicle should obey based on a current lane of the vehicle. Simple heuristics based on the estimated traffic signal orientation or position, average intersection width, and average lane width may be used to make an estimate of an association between a traffic signal and a lane.

In one example, the location of the traffic signal may also be stored in a memory. Any of the target area information or other contextual information (e.g., speed, location, orientation, time, date, etc.) may also be stored along with the location of the traffic signal. In one instance, the stored information may be used to update a map of locations of traffic signals for an area.

At block 108, the method 100 includes determining a state of the traffic signal. In an instance in which multiple traffic signals are detected in the target area information, a state of a traffic signal corresponding to a lane of the vehicle may be determined. Determining the state of the traffic signal may include determining which object in a pattern of red, yellow, and green objects of an image of the traffic signal is illuminated. In one instance, an imaging processing method may be used to determine a distinction between brightness of the red, yellow, and green objects to determine an object with the highest brightness. The object with the highest brightness may be assumed to be on, for example, indicating a state of the traffic signal. In one example, if the relative distinction between the red, yellow, and green objects is unclear, it may be assumed that the yellow object is illuminated. Similarly, confidence in an observed bright green object may be downgraded over time, and default to an assumption that the traffic signal is yellow if the green object is not detected again within a predetermined time frame.

In an instance in which the 3D position of the traffic signal is determined, a prediction of where a traffic signal should appear in a subsequent image may be used to determine another image of the traffic signal. For example, based on an estimate of a position of the vehicle with respect to the 3D position, a prediction position can be projected into the image frame of a camera of the vehicle. In one example, the predicted position may be an axis-aligned bounding box which selects a portion of the image. However, other example regions or shapes are also possible, and the geometry of the predicted position may be determined based on an orientation or geometry of the traffic signal. The portion of the image within the predicted position may then be analyzed to determine the state of the traffic signal. For example, the predicted position may be processed to identify brightly colored red or green objects, and the predicted position may change as the position of the vehicle approaches the traffic signal.

At block 110, the method 100 includes determining a confidence in the traffic signal. When making a conclusion about the existence of a traffic signal and a subsequent state estimation for the traffic signal, a processor of a computing system of the vehicle may determine a confidence in the conclusion. As an example, the determined confidence may be more confident of a detection of a traffic light in locations for which traffic signals are expected than in locations for which traffic signals are not expected. In one instance, traffic signals may be expected for a location if the location of the vehicle is proximate (e.g., within a predetermined threshold such as 150 meters) to an intersection. In one instance, a distance to an intersection may be determined by comparing a location of the vehicle to locations of intersections or nodes on a map of the environment. For example, a k-dimensional tree "k-d tree") may be used to organize nodes of intersections to facilitate nearest neighbor searches.

In another instance, determining a confidence in the traffic signal may include comparing the location of the traffic signal to one or more known locations of traffic signals. For example, the vehicle may have access to a map of known locations of traffic signals, stored locally or remote from the vehicle. Based on a geographic location of the vehicle, one or more known locations of traffic signals that are nearby may be determined. In some instances, a k-d tree may be used to organize known locations of traffic signals to facilitate nearest neighbor searches.

At block 112, the method 100 includes controlling the vehicle in the autonomous mode based on the state of the traffic signal and the confidence in the traffic signal. The state and/or position of the traffic signal may be used in some scenarios to assist the vehicle, or a driver or passenger of the vehicle.

When the vehicle is driven by a user, information regarding the state of the traffic signal may be provided. For example, a visual or audible indication that a light is red, yellow, or green may be provided. In other instances, instructions or warnings may be provided to the user such as "apply the brakes, the light is red". The visible or audible indication may also be provided after a change in the state of a traffic signal.

When the vehicle is operated autonomously, a control system of the vehicle may decide a path for the vehicle based on the state of the traffic signal and the determined confidence. For example, the vehicle may cross a traffic intersection if a green object has been detected for a traffic signal in a position that is expected for the traffic signal. In an instance, in which a yellow object has been detected for a traffic signal in an area that is unexpected for a traffic signal, the vehicle may decrease its speed and determine additional information regarding the area in order to confirm the existence and estimated state for the traffic signal.

Thus, the example method 100 may enable a vehicle to determine positions and states of traffic signals in expected locations and/or unexpected locations. A number of example implementations of the method 100 are described below in connection with FIGS. 2A-5C.

For purposes of illustration, a number of example implementations are described. It is to be understood, however, that the example implementations are illustrative only and are not meant to limiting. Other example implementations are possible as well.

Figure 2A:
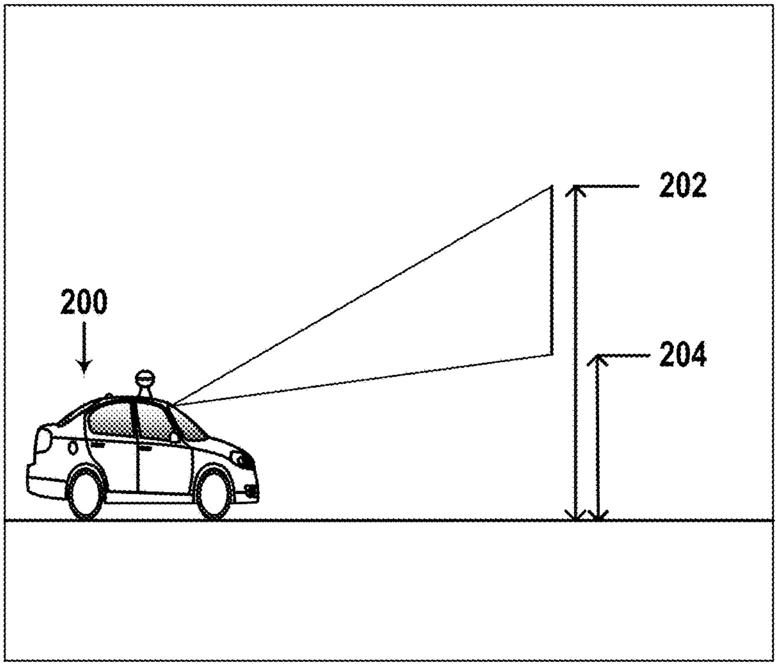
FIGS. 2A-2C are example conceptual illustrations of a vehicle scanning a target area.
Figure 2B:
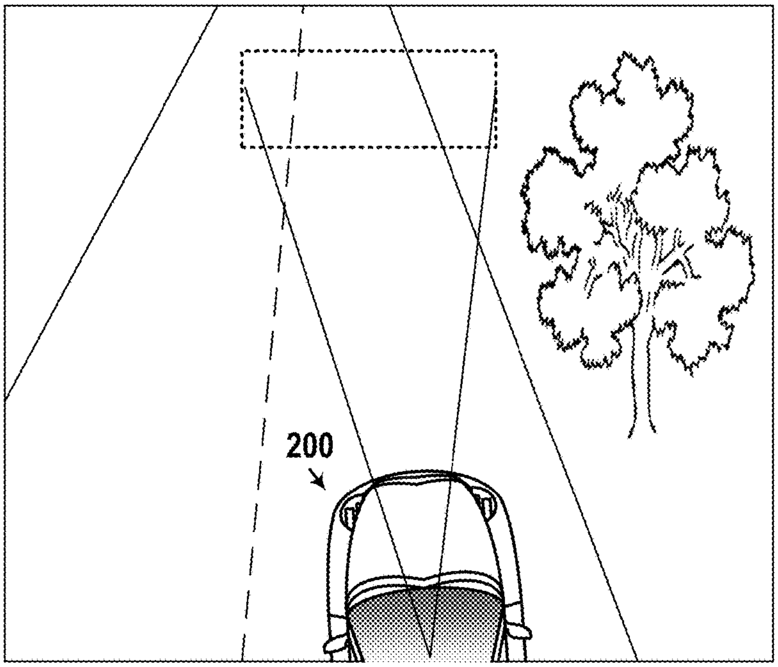
Figure 2C:
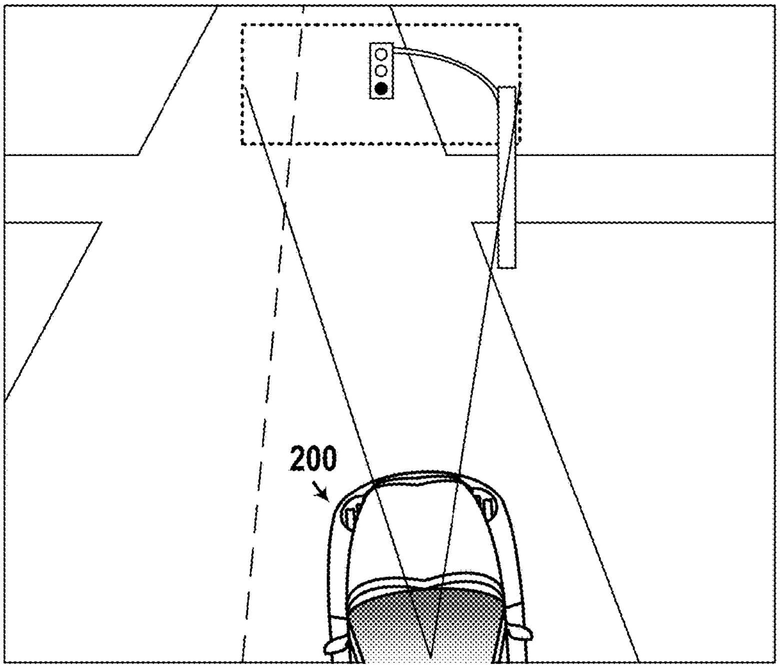

FIGS. 2A-2C are example conceptual illustrations of a vehicle 200 scanning a target area. For example, FIGS. 2A-2C illustrate a side view and two perspective views of the vehicle 200 scanning a target area. The vehicle 200 may scan a target area even if traffic signals are unexpected for a location. For example, FIG. 2B illustrates the vehicle 200 scanning a target area that is not proximate to an intersection while FIG. 2C illustrates the vehicle 200 scanning a target area that is proximate to an intersection. In some examples, scanning the target area may enable the vehicle 200 to obtain target area information for types of areas in which traffic signals are typically located.

As shown in FIG. 2A, the vehicle 200 may scan an area between a first height 202 and second height 204 above the ground for an upcoming area. In one example, the first height 202 and second height 204 above the ground may be determined for a predetermined distance in front of the vehicle (e.g., 100 meters). In one instance, the first height 202 and second height 204 may form a smaller target area (e.g., a narrower range of heights) for objects occurring at a distance from the vehicle 200 that is less than the predetermined distance and larger target area (e.g., a broader range of heights) for objects occurring at a distance that is greater than the predetermined distance.

In one instance, an imaging component and/or radar component of the vehicle 200 may be used to obtain target area information for the target area. The imaging component and radar component may be mounted behind or adjacent to a rear-view mirror, such that in a scenario in which the vehicle 200 includes a driver and/or passenger(s), the imaging component or radar component minimally obstructs a field of view of the driver and/or passenger(s).

In some examples, additional information for areas above, below, and/or adjacent to the target area may also be obtained. For example, the imaging component may be a camera configured to capture one or more images of the target area information, and the one or more images may include information for an area that is not part of the target area. In one instance, a processing component may analyze the target area information while ignoring the additional information. In other examples, a field of view and/or focal length of the camera may be modified such that the camera captures information for the target area alone.

Additionally, the target area information may include information for any range of distances from the vehicle. For example, a focus of the imaging component may be fixed or variable. In one instance, an imaging component may include a rangefinding component, configured to detect a distance to an object in a field of view and adjust a focus of the imaging component accordingly. In another example, a focus of the imaging component may vary based on a speed of the vehicle. For example traffic signals may be detected at a greater distance when the speed is a first speed and detected at a lessor distance when the speed is lower than the first speed.

Figure 3A:
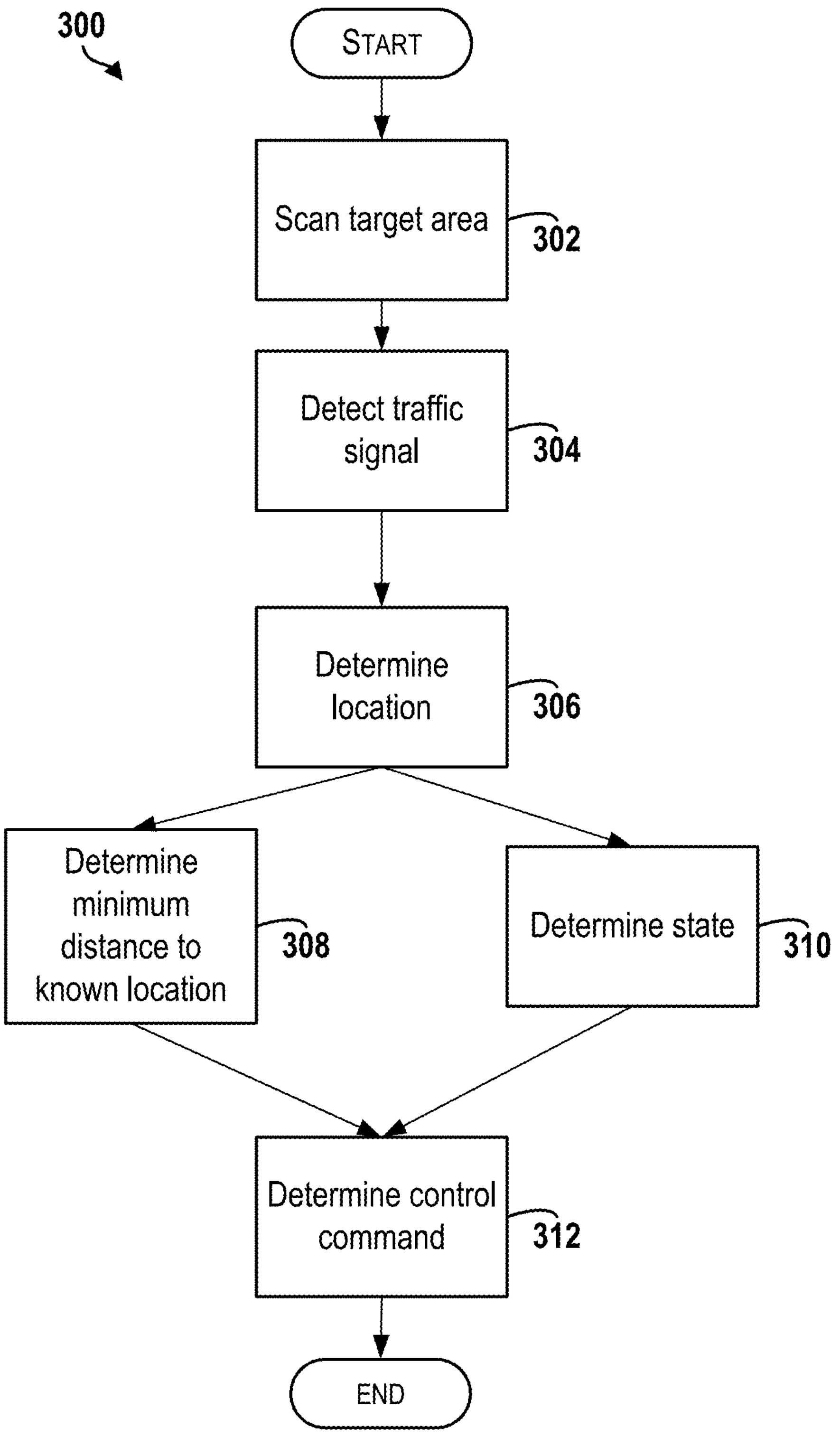

FIGS. 3A-3B are an example flowchart 300 and associated state table 314 for controlling a vehicle. As shown in FIG. 3A, initially at block 302, a target area may be scanned. For example, a type of area where traffic signals are typically located may be scanned to obtain target area information. In one example, a traffic signal may be detected at block 304. For instance, the target area information may include information indicative of the existence of a traffic signal.

At block 306, a location of the traffic signal may be determined. In one instance, the location of the traffic signal may be determined based on a location and/or orientation of the vehicle, and may be a two-dimension location (e.g., a location described by a latitude and longitude) or a three-dimensional location (e.g., a location described by latitude, longitude, and height above ground).

Additionally, according to the flowchart 300, at block 308 a minimum distance to a known location of a traffic signal may be determined. In one example, known locations of traffic signals may be stored within a k-d tree, and a nearest neighbor search may be performed to determine known locations of traffic signals that are nearby a location of the vehicle and/or a determined location of the detected traffic signal. In one instance, distances may be calculated between a location of the vehicle and known locations of traffic signals, and a minimum distance may be determined. In another instance, distances may be calculated between the determined location of the detected traffic signal and the known locations of traffic signals, and a minimum distance may be determined. Meanwhile, at block 310, a state of the detected traffic signal may be determined.

In one example, a relationship between the minimum distance and a predetermined threshold may be determined (e.g., proximity of the minimum distance to the predetermined threshold or a determination whether the minimum distance is greater or less than the predetermined threshold). At block 312, based on the determined relationship and a determined state of the traffic signal, a control command for the vehicle may be determined. The example state table 314 shown in FIG. 3B describes one example of how the control command may be determined.

As shown in FIG. 3B, based on a state of a traffic signal, and a relationship between the minimum distance and the predetermined threshold, various control commands may be selected. In some instances, the relationship between the minimum distance and the predetermined threshold may suggest a confidence in the detected traffic signal.

In a first instance 316, a state of the traffic signal may be red, and a minimum distance may be greater than the predetermined threshold. The state table 314 shows that a first control command 318 may be selected. The first instance 316 may suggest that a traffic signal was not expected. Accordingly, the first control command 318 indicates to brake and determine additional information regarding the existence of the traffic signal and a subsequent state of the traffic signal. In one example, determining additional information may involve monitoring the state of the traffic signal as well as behavior of nearby traffic and/or cross traffic.

Figure 4:
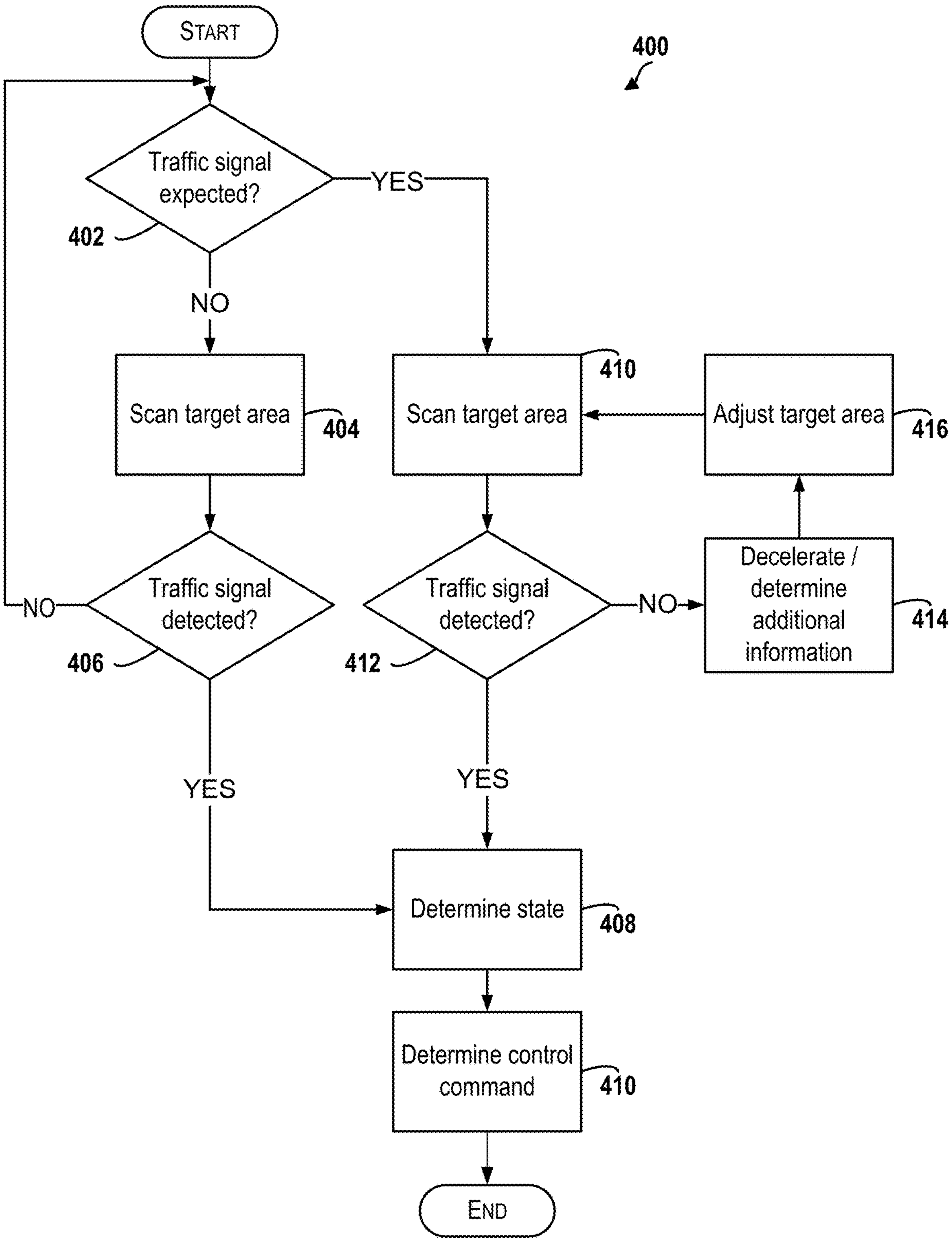
FIG. 4 is another example flow chart for controlling a vehicle.

FIG. 4 is another example flow chart 400 for controlling a vehicle. As shown, at block 402, a determination may be made whether a traffic signal is expected. In one example, the determination may be made based on a whether the location of the vehicle is proximate to an intersection, or whether a prior map suggests a traffic signal exists nearby the location of the vehicle, such as in a direction the vehicle is traveling.

Based on the determination, if a traffic signal is not expected, at block 404, the vehicle may scan a target area to obtain target area information. Subsequently, a determination may be made whether a traffic signal is detected in the target area information at block 406. If a traffic signal is not detected, the flow chart process may restart. If a determination is made that a traffic signal is detected, a state of the traffic signal and control command may be determined at blocks 408 and 410 respectively.

If a determination is made at block 402 that a traffic signal is expected, the vehicle may scan a target area to obtain target area information at 410. In one example, the target area may be the same target area scanned at block 404. In another example, the target area may be different than the target area scanned at block 404. In an instance in which a traffic signal is expected at a known location, the target area scanned at block 410 may be an area surrounding the known location.

Subsequently, at block 412, a determination may be made whether or not a traffic signal is detected in the target area information. If a traffic signal is detected, a state of the traffic signal and control command may be determined at blocks 408 and 410 respectively. In one example, the control command may be different for an instance in which the traffic signal is expected and an instance in which the traffic signal is not expected. If a traffic signal is not detected, the vehicle may decelerate, and additional information may be determined at block 414. For instance, the vehicle may determine information about behavior of traffic and nearby cross-traffic or request more information from a passenger or driver of the vehicle. At block 416, the target area may be adjusted. For example, the target area may be widened, and the target area may be rescanned at block 410. In some instances, widening the target area may enable the detection of temporarily relocated traffic signals and or traffic signals that are swinging in the wind.

Figure 5A:
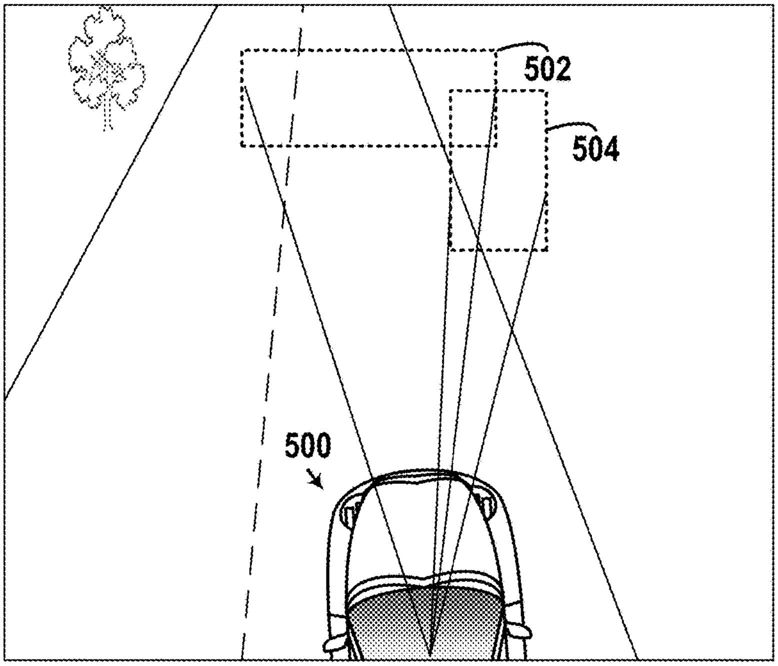
FIGS. 5A-5C are further example conceptual illustrations of a vehicle scanning a target area.
Figure 5B:
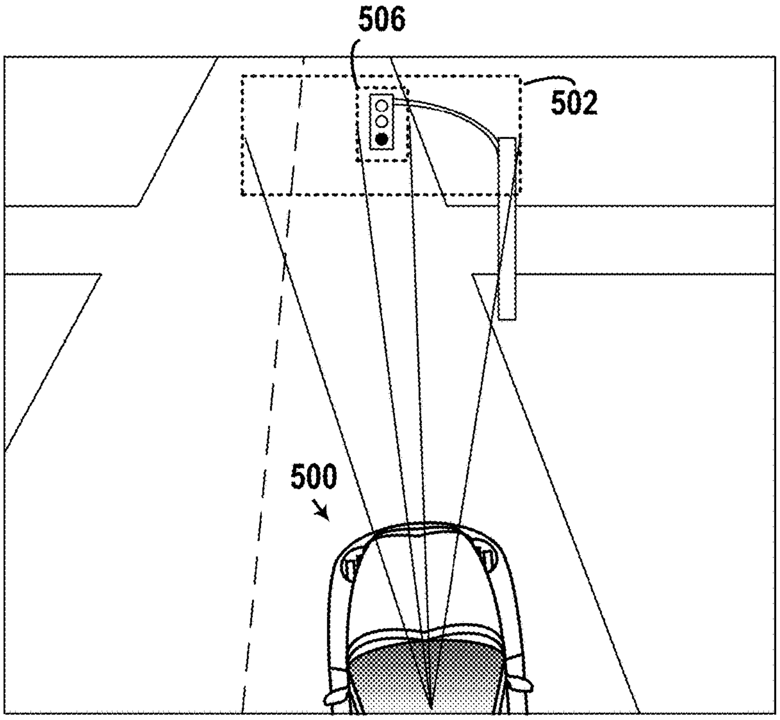
Figure 5C:
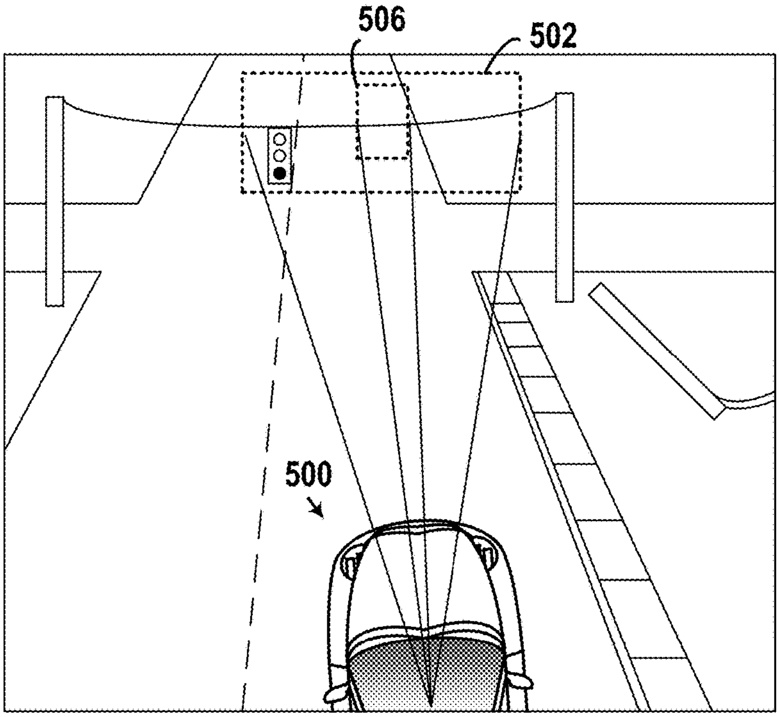

FIGS. 5A-5C are further example conceptual illustrations of a vehicle 500 scanning a target area. In some examples, the vehicle 500 may scan multiple target areas. As shown in FIG. 5A, the vehicle 500 may scan a first target area 502 and a second target area 504. In one instance, scanning an area or areas adjacent to the road in addition to above the road may enable detection of more traffic signals or objects beyond traffic signals. For example, flashing traffic signals due to pedestrian crossings, construction warnings, railroad crossings or other information may be detected.

As shown in FIG. 5B, in an instance in which more precise information about an expected location of a traffic signal is known, a sub-area 506 may be scanned in addition to the target area 502. As shown in FIG. 5C, in an instance in which a location of the expected traffic signal has been moved, a traffic signal may not be detected within the sub-area 506. However, scanning the larger target area 502 may facilitate detection of the traffic signal in the new location.

Systems in which example embodiments of the above example methods may be implemented will now be described in greater detail. In general, an example system may be implemented in or may take the form of a vehicle. The vehicle may take a number of forms, including, for example, automobiles, cars, trucks, motorcycles, buses, boats, airplanes, helicopters, lawn mowers, earth movers, snowmobiles, recreational vehicles, amusement park vehicles, farm equipment, construction equipment, trams, golf carts, trains, and trolleys. Other vehicles are possible as well.

Further, another example system may take the form of non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

FIG. 6 illustrates an example vehicle 600, in accordance with an embodiment. In particular, FIG. 6 shows a Right Side View, Front View, Back View, and Top View of the vehicle 600. Although vehicle 600 is illustrated in FIG. 6 as a car, other embodiments are possible. For instance, the vehicle 600 could represent a truck, a van, a semi-trailer truck, a motorcycle, a golf cart, an off-road vehicle, or a farm vehicle, among other examples. As shown, the vehicle 600 includes a first sensor unit 602, a second sensor unit 604, a third sensor unit 606, a wireless communication system 608, and a camera 610.

Each of the first, second, and third sensor units 602-606 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 602 are shown to be mounted in particular locations on the vehicle 600, in some embodiments the sensor unit 602 may be mounted elsewhere on the vehicle 600, either inside or outside the vehicle 600. Further, while only three sensor units are shown, in some embodiments more or fewer sensor units may be included in the vehicle 600.

In some embodiments, one or more of the first, second, and third sensor units 602-606 may include one or more movable mounts on which the sensors may be movably mounted. The movable mount may include, for example, a rotating platform. Sensors mounted on the rotating platform could be rotated so that the sensors may obtain information from each direction around the vehicle 600. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 602-606 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 608 may be any system configured to wirelessly couple to one or more other vehicles, sensors, or other entities, either directly or via a communication network. To this end, the wireless communication system 608 may include an antenna and a chipset for communicating with the other vehicles, sensors, or other entities either directly or via a communication network. The chipset or wireless communication system 608 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 608 may take other forms as well.

While the wireless communication system 608 is shown positioned on a roof of the vehicle 600, in other embodiments the wireless communication system 608 could be located, fully or in part, elsewhere.

The camera 610 may be any camera (e.g., a still camera, a video camera, etc.) configured to capture images of the environment in which the vehicle 600 is located. To this end, the camera 610 may be configured to detect visible light, or may be configured to detect light from other portions of the spectrum, such as infrared or ultraviolet light. Other types of cameras are possible as well. The camera 610 may be a two-dimensional detector, or may have a three-dimensional spatial range. In some embodiments, the camera 610 may be, for example, a range detector configured to generate a two-dimensional image indicating a distance from the camera 610 to a number of points in the environment. To this end, the camera 610 may use one or more range detecting techniques. For example, the camera 610 may use a structured light technique in which the vehicle 600 illuminates an object in the environment with a predetermined light pattern, such as a grid or checkerboard pattern and uses the camera 610 to detect a reflection of the predetermined light pattern off the object. Based on distortions in the reflected light pattern, the vehicle 600 may determine the distance to the points on the object. The predetermined light pattern may comprise infrared light, or light of another wavelength. As another example, the camera 610 may use a laser scanning technique in which the vehicle 600 emits a laser and scans across a number of points on an object in the environment. While scanning the object, the vehicle 600 uses the camera 610 to detect a reflection of the laser off the object for each point. Based on a length of time it takes the laser to reflect off the object at each point, the vehicle 600 may determine the distance to the points on the object. As yet another example, the camera 610 may use a time-of-flight technique in which the vehicle 600 emits a light pulse and uses the camera 610 to detect a reflection of the light pulse off an object at a number of points on the object. In particular, the camera 610 may include a number of pixels, and each pixel may detect the reflection of the light pulse from a point on the object. Based on a length of time it takes the light pulse to reflect off the object at each point, the vehicle 600 may determine the distance to the points on the object. The light pulse may be a laser pulse. Other range detecting techniques are possible as well, including stereo triangulation, sheet-of-light triangulation, interferometry, and coded aperture techniques, among others. The camera 610 may take other forms as well.

In some embodiments, the camera 610 may include a movable mount and/or an actuator, as described above, that are configured to adjust the position and/or orientation of the camera 610 by moving the camera 610 and/or the movable mount.

While the camera 610 is shown to be mounted inside a front windshield of the vehicle 600, in other embodiments the camera 610 may be mounted elsewhere on the vehicle 600, either inside or outside the vehicle 600.

The vehicle 600 may include one or more other components in addition to or instead of those shown.

FIG. 7 is a simplified block diagram of an example vehicle 700, in accordance with an embodiment. The vehicle 700 may, for example, be similar to the vehicle 600 described above in connection with FIG. 6. The vehicle 700 may take other forms as well.

As shown, the vehicle 700 includes a propulsion system 702, a sensor system 704, a control system 706, peripherals 708, and a computer system 710 including a processor 712, data storage 714, and instructions 716. In other embodiments, the vehicle 700 may include more, fewer, or different systems, and each system may include more, fewer, or different components. Additionally, the systems and components shown may be combined or divided in any number of ways.

The propulsion system 702 may be configured to provide powered motion for the vehicle 700. As shown, the propulsion system 702 includes an engine/motor 718, an energy source 720, a transmission 722, and wheels/tires 724.

The engine/motor 718 may be or include any combination of an internal combustion engine, an electric motor, a steam engine, and a Stirling engine. Other motors and engines are possible as well. In some embodiments, the propulsion system 702 could include multiple types of engines and/or motors. For instance, a gas-electric hybrid car could include a gasoline engine and an electric motor. Other examples are possible.

The energy source 720 may be a source of energy that powers the engine/motor 718 in full or in part. That is, the engine/motor 718 may be configured to convert the energy source 720 into mechanical energy. Examples of energy sources 720 include gasoline, diesel, propane, other compressed gas-based fuels, ethanol, solar panels, batteries, and other sources of electrical power. The energy source(s) 720 could additionally or alternatively include any combination of fuel tanks, batteries, capacitors, and/or flywheels. In some embodiments, the energy source 720 may provide energy for other systems of the vehicle 700 as well.

The transmission 722 may be configured to transmit mechanical power from the engine/motor 718 to the wheels/tires 724. To this end, the transmission 722 may include a gearbox, clutch, differential, drive shafts, and/or other elements. In embodiments where the transmission 722 includes drive shafts, the drive shafts could include one or more axles that are configured to be coupled to the wheels/tires 724.

The wheels/tires 724 of vehicle 700 could be configured in various formats, including a unicycle, bicycle/motorcycle, tricycle, or car/truck four-wheel format. Other wheel/tire formats are possible as well, such as those including six or more wheels. In any case, the wheels/tires 724 of vehicle 724 may be configured to rotate differentially with respect to other wheels/tires 724. In some embodiments, the wheels/tires 724 may include at least one wheel that is fixedly attached to the transmission 722 and at least one tire coupled to a rim of the wheel that could make contact with the driving surface. The wheels/tires 724 may include any combination of metal and rubber, or combination of other materials.

The propulsion system 702 may additionally or alternatively include components other than those shown.

The sensor system 704 may include a number of sensors configured to sense information about an environment in which the vehicle 700 is located, as well as one or more actuators 736 configured to modify a position and/or orientation of the sensors. As shown, the sensors of the sensor system include a Global Positioning System (GPS) 726, an inertial measurement unit (IMU) 728, a RADAR unit 730, a laser rangefinder and/or LIDAR unit 732, and a camera 734. The sensor system 704 may include additional sensors as well, including, for example, sensors that monitor internal systems of the vehicle 700 (e.g., an $O_2$ monitor, a fuel gauge, an engine oil temperature, etc.). Other sensors are possible as well.

The GPS 726 may be any sensor configured to estimate a geographic location of the vehicle 700. To this end, the GPS 726 may include a transceiver configured to estimate a position of the vehicle 700 with respect to the Earth. The GPS 726 may take other forms as well.

The IMU 728 may be any combination of sensors configured to sense position and orientation changes of the vehicle 700 based on inertial acceleration. In some embodiments, the combination of sensors may include, for example, accelerometers and gyroscopes. Other combinations of sensors are possible as well.

The RADAR 730 unit may be any sensor configured to sense objects in the environment in which the vehicle 700 is located using radio signals. In some embodiments, in addition to sensing the objects, the RADAR unit 730 may additionally be configured to sense the speed and/or heading of the objects.

Similarly, the laser rangefinder or LIDAR unit 732 may be any sensor configured to sense objects in the environment in which the vehicle 700 is located using lasers. In particular, the laser rangefinder or LIDAR unit 732 may include a laser source and/or laser scanner configured to emit a laser and a detector configured to detect reflections of the laser. The laser rangefinder or LIDAR 732 may be configured to operate in a coherent (e.g., using heterodyne detection) or an incoherent detection mode.

The camera 734 may be any camera (e.g., a still camera, a video camera, etc.) configured to capture images of the environment in which the vehicle 700 is located. To this end, the camera may take any of the forms described above.

The sensor system 704 may additionally or alternatively include components other than those shown.

The control system 706 may be configured to control operation of the vehicle 700 and its components. To this end, the control system 706 may include a steering unit 738, a throttle 740, a brake unit 742, a sensor fusion algorithm 744, a computer vision system 746, a navigation or pathing system 748, and an obstacle avoidance system 750.

The steering unit 738 may be any combination of mechanisms configured to adjust the heading of vehicle 700.

The throttle 740 may be any combination of mechanisms configured to control the operating speed of the engine/motor 718 and, in turn, the speed of the vehicle 700.

The brake unit 742 may be any combination of mechanisms configured to decelerate the vehicle 700. For example, the brake unit 742 may use friction to slow the wheels/tires 724. As another example, the brake unit 742 may convert the kinetic energy of the wheels/tires 724 to electric current. The brake unit 742 may take other forms as well.

The sensor fusion algorithm 744 may be an algorithm (or a computer program product storing an algorithm) configured to accept data from the sensor system 704 as an input. The data may include, for example, data representing information sensed at the sensors of the sensor system 704. The sensor fusion algorithm 744 may include, for example, a Kalman filter, a Bayesian network, or another algorithm. The sensor fusion algorithm 744 may further be configured to provide various assessments based on the data from the sensor system 704, including, for example, evaluations of individual objects and/or features in the environment in which the vehicle 700 is located, evaluations of particular situations, and/or evaluations of possible impacts based on particular situations. Other assessments are possible as well.

The computer vision system 746 may be any system configured to process and analyze images captured by the camera 734 in order to identify objects and/or features in the environment in which the vehicle 700 is located, including, for example, traffic signals and obstacles. To this end, the computer vision system 746 may use an object recognition algorithm, a Structure from Motion (SFM) algorithm, video tracking, or other computer vision techniques. In some embodiments, the computer vision system 746 may additionally be configured to map the environment, track objects, estimate the speed of objects, etc.

The navigation and pathing system 748 may be any system configured to determine a driving path for the vehicle 700. The navigation and pathing system 748 may additionally be configured to update the driving path dynamically while the vehicle 700 is in operation. In some embodiments, the navigation and pathing system 748 may be configured to incorporate data from the sensor fusion algorithm 744, the GPS 726, and one or more predetermined maps so as to determine the driving path for vehicle 700.

The obstacle avoidance system 750 may be any system configured to identify, evaluate, and avoid or otherwise negotiate obstacles in the environment in which the vehicle 700 is located.

The control system 706 may additionally or alternatively include components other than those shown.

Peripherals 708 may be configured to allow the vehicle 700 to interact with external sensors, other vehicles, and/or a user. To this end, the peripherals 708 may include, for example, a wireless communication system 752, a touchscreen 754, a microphone 756, and/or a speaker 758.

The wireless communication system 752 may take any of the forms described above.

The touchscreen 754 may be used by a user to input commands to the vehicle 700. To this end, the touchscreen 754 may be configured to sense at least one of a position and a movement of a user's finger via capacitive sensing, resistance sensing, or a surface acoustic wave process, among other possibilities. The touchscreen 754 may be capable of sensing finger movement in a direction parallel or planar to the touchscreen surface, in a direction normal to the touchscreen surface, or both, and may also be capable of sensing a level of pressure applied to the touchscreen surface. The touchscreen 754 may be formed of one or more translucent or transparent insulating layers and one or more translucent or transparent conducting layers. The touchscreen 754 may take other forms as well.

The microphone 756 may be configured to receive audio (e.g., a voice command or other audio input) from a user of the vehicle 700. Similarly, the speakers 758 may be configured to output audio to the user of the vehicle 700.

The peripherals 708 may additionally or alternatively include components other than those shown.

The computer system 710 may be configured to transmit data to and receive data from one or more of the propulsion system 702, the sensor system 704, the control system 706, and the peripherals 708. To this end, the computer system 710 may be communicatively linked to one or more of the propulsion system 702, the sensor system 704, the control system 706, and the peripherals 708 by a system bus, network, and/or other connection mechanism (not shown).

The computer system 710 may be further configured to interact with and control one or more components of the propulsion system 702, the sensor system 704, the control system 706, and/or the peripherals 708. For example, the computer system 710 may be configured to control operation of the transmission 722 to improve fuel efficiency. As another example, the computer system 710 may be configured to cause the camera 734 to capture images of the environment. As yet another example, the computer system 710 may be configured to store and execute instructions corresponding to the sensor fusion algorithm 744. As still another example, the computer system 710 may be configured to store and execute instructions for displaying a display on the touchscreen 754. Other examples are possible as well.

As shown, the computer system 710 includes the processor 712 and data storage 714. The processor 712 may comprise one or more general-purpose processors and/or one or more special-purpose processors. To the extent the processor 712 includes more than one processor, such processors could work separately or in combination. Data storage 714, in turn, may comprise one or more volatile and/or one or more non-volatile storage components, such as optical, magnetic, and/or organic storage, and data storage 714 may be integrated in whole or in part with the processor 712.

In some embodiments, data storage 714 may contain instructions 716 (e.g., program logic) executable by the processor 712 to execute various vehicle functions, including those described above in connection with FIG. 1. Further, data storage 714 may contain constraints 760 for the vehicle 700, which may take any of the forms described above. Data storage 714 may contain additional instructions as well, including instructions to transmit data to, receive data from, interact with, and/or control one or more of the propulsion system 702, the sensor system 704, the control system 706, and the peripherals 708.

The computer system 702 may additionally or alternatively include components other than those shown.

As shown, the vehicle 700 further includes a power supply 710, which may be configured to provide power to some or all of the components of the vehicle 700. To this end, the power supply 710 may include, for example, a rechargeable lithium-ion or lead-acid battery. In some embodiments, one or more banks of batteries could be configured to provide electrical power. Other power supply materials and configurations are possible as well. In some embodiments, the power supply 710 and energy source 720 may be implemented together, as in some all-electric cars.

In some embodiments, one or more of the propulsion system 702, the sensor system 704, the control system 706, and the peripherals 708 could be configured to work in an interconnected fashion with other components within and/or outside their respective systems.

Further, the vehicle 700 may include one or more elements in addition to or instead of those shown. For example, the vehicle 700 may include one or more additional interfaces and/or power supplies. Other additional components are possible as well. In such embodiments, data storage 714 may further include instructions executable by the processor 712 to control and/or communicate with the additional components.

Still further, while each of the components and systems are shown to be integrated in the vehicle 700, in some embodiments, one or more components or systems may be removably mounted on or otherwise connected (mechanically or electrically) to the vehicle 700 using wired or wireless connections.

The vehicle 700 may take other forms as well.

Figure 8:
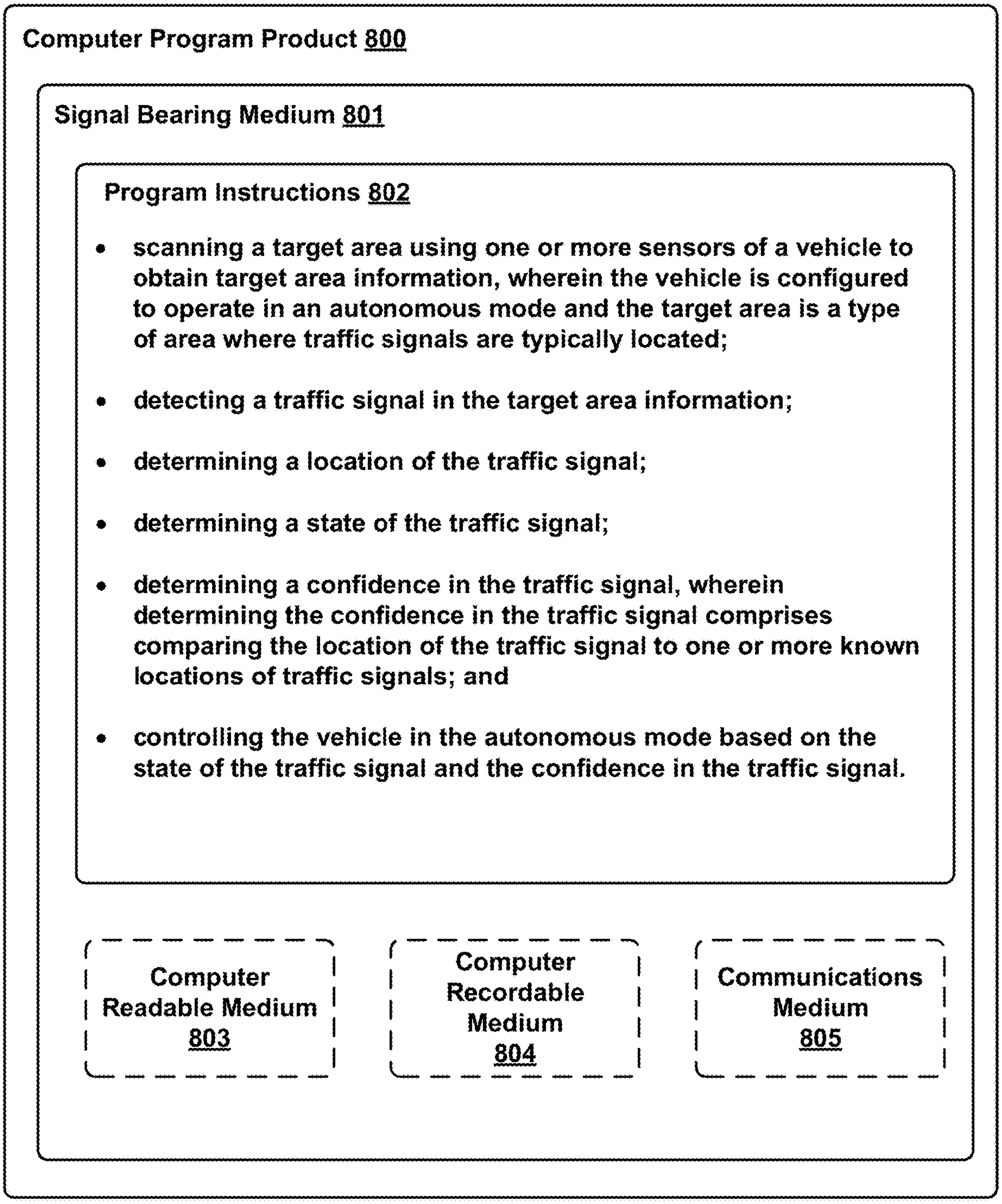
FIG. 8 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 800 that includes a computer program for executing a computer process on a computing device, arranged according to at least some embodiments presented herein.

In one embodiment, the example computer program product 800 is provided using a signal bearing medium 802. The signal bearing medium 802 may include one or more programming instructions 804 that, when executed by one or more processors, may provide functionality or portions of the functionality described above with respect to FIGS. 1-7.

In some embodiments, the signal bearing medium 802 may encompass a computer-readable medium 806, such as, but not limited to, a hard disk drive, a Compact Disc (CD), a Digital Video Disk (DVD), a digital tape, memory, etc. Further, in some embodiments the signal bearing medium 802 may encompass a computer recordable medium 808, such as, but not limited to, memory, read/write (R/W) CDs, R/W DVDs, etc. Still further, in some embodiments the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing system such as the computing system 710 of FIG. 7 may be configured to provide various operations, functions, or actions in response to the programming instructions 804 being conveyed to the computing system 710 by one or more of the computer readable medium 806, the computer recordable medium 808, and/or the communications medium 810.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of controlling a vehicle, the method comprising:

monitoring, by a computing system and using first sensor data from one or more sensors coupled to the vehicle, a first target area located relative to the vehicle traveling in an environment, wherein the first target area is determined based on statistics for positions of traffic signals;

detecting a change corresponding to the environment or the vehicle;

responsive to detecting the change, monitoring a second target area located relative to the vehicle using second sensor data from the one or more sensors, wherein the first target area and the second target area differ in size or shape; and controlling the vehicle based on monitoring the second target area.

2. The method of claim 1, wherein detecting the change in condition corresponding to the environment or the vehicle comprises:

determining the vehicle is approaching an intersection; and based on determining the vehicle is approaching the intersection, switching from monitoring the first target area to monitoring the second target area, wherein the second target area is an expansion of the first target area.

3. The method of claim 2, wherein determining the vehicle is approaching the intersection comprises:

determining the vehicle is approaching the intersection based on a map of the environment.

4. The method of claim 2, wherein determining the vehicle is approaching the intersection comprises:

determining the vehicle is approaching the intersection based on an output generated by monitoring the first target area of the environment using the one or more sensors.

5. The method of claim 1, wherein detecting the change in condition corresponding to the environment or the vehicle comprises:

detecting a change in speed of the vehicle; and modifying a width of the first target area to form the second target area based on detecting the change in speed of the vehicle.

6. The method of claim 1, wherein detecting the change in condition corresponding to the environment or the vehicle comprises:

determining the vehicle is approaching a turn; and expanding the first target area to form the second target area for use during performance of the turn by the vehicle.

7. The method of claim 1, further comprising:

identifying a traffic signal in an output generated by monitoring the second target area using the one or more sensors; and controlling the vehicle based on a state of the traffic signal.

8. The method of claim 7, further comprising:

determining the state of the traffic signal based on the first sensor data generated by the one or more sensors; and confirming the state of the traffic signal based on the second sensor data generated by the one or more sensors.

9. The method of claim 1, wherein detecting the change in condition corresponding to the environment or the vehicle comprises:

detecting a change in speed or orientation of a given vehicle in the environment; and switching from monitoring the first target area to monitoring the second target area based on detecting the change in speed or orientation of the given vehicle.

10. The method of claim 1, wherein the first target area comprises a range of heights above a ground surface, the range of heights determined based on statistical information indicating that a given percentage of traffic signals are elevated within the range of heights.

11. The method of claim 1, wherein detecting the change corresponding to the environment or the vehicle comprises detecting a change in speed or orientation of the vehicle, and wherein monitoring the second target area comprises monitoring a target area that is wider than the first target area.

12. A system comprising:

a plurality of sensors coupled to a vehicle; and a computing system coupled to the vehicle, wherein the computing system is configured to:

monitor, using first sensor data from one or more sensors of the plurality of sensors, a first target area located relative to the vehicle traveling in an environment, wherein the first target area is determined based on statistics for positions of traffic signals;

detect a change corresponding to the environment or the vehicle;

responsive to detecting the change, monitor a second target area located relative to the vehicle using second sensor data from the one or more sensors, wherein the first target area and the second target area differ in size or shape; and control the vehicle based on monitoring the second target area.

13. The system of claim 12, wherein the plurality of sensors includes a global positioning system (GPS) receiver and a camera.

14. The system of claim 12, wherein the computing system is further configured to:

determine the vehicle is approaching an intersection; and expand the first target area to form the second target area for use during navigation of the intersection by the vehicle.

15. The system of claim 14, wherein the computing system is configured to:

determine the vehicle is approaching the intersection based on map data or an output generated by scanning the target area using the one or more sensors.

16. The system of claim 12, wherein the computing system is further configured to:

detect a change in speed of the vehicle; and modify a width of the first target area to form the second target area based on detecting the change in speed of the vehicle.

17. The system of claim 12, wherein the computing system is further configured to:

determine the vehicle is approaching a turn; and expand the first target area to form the second target area for use during performance of the turn by the vehicle.

18. The system of claim 12, wherein the computing system is further configured to:

identify a traffic signal in an output generated by monitoring the second target area using the one or more sensors; and control the vehicle based on a state of the traffic signal.

19. The system of claim 18, wherein the computing system is further configured to:

determine the state of the traffic signal based on the first sensor data generated by the one or more sensors; and confirm the state of the traffic signal based on the second sensor data generated by the one or more sensors.

20. A non-transitory computer-readable medium having stored therein instructions executable by a computing device to cause the computing device to perform functions comprising:

monitoring, using first sensor data from one or more sensors coupled to a vehicle, a first target area located relative to the vehicle traveling in an environment, wherein the first target area is determined based on statistics for positions of traffic signals;

detecting a change corresponding to the environment or the vehicle;

responsive to detecting the change, monitoring a second target area located relative to the vehicle using second sensor data from the one or more sensors, wherein the first target area and the second target area differ in size or shape; and controlling the vehicle based on monitoring the second target area.

* * * * *